March 2, 1965 R. L. SEARCY ETAL 3,171,793
FERMENTATIVE ANALYTICAL PROCEDURE AND APPARATUS THEREFOR
Filed April 25, 1962

INVENTORS
RONALD L. SEARCY
LOIS M. BERGQUIST
BY
ATTORNEY

United States Patent Office 3,171,793
Patented Mar. 2, 1965

3,171,793
FERMENTATIVE ANALYTICAL PROCEDURE
AND APPARATUS THEREFOR
Ronald L. Searcy, 1199 Crest Haven Way, Monterey
Park, Calif., and Lois M. Bergquist, 6219 Riverton,
North Hollywood, Calif.
Filed Apr. 25, 1962, Ser. No. 189,967
2 Claims. (Cl. 195—103.5)

The present invention relates to an improved analytic method and to an apparatus for performing that method. More particularly, it relates to a novel, simple micro-fermentation technique and an apparatus which facilitates the identification and classification of microorganisms.

The fermentative powers of various microorganisms may be tested by allowing the microorganism to grow upon a culture medium containing carbohydrates. Some bacteria are capable of fermenting one or more carbohydrates, whereas others are unable to do so. When grown upon a culture medium containing a carbohydrate such as glucose, certain bacteria, those which are capable of fermenting carbohydrate, will produce gas and an acid, other bacteria will produce acid alone and still others, those which are incapable of fermentation, will produce neither an acid or gas. Obviously, in the classification and identification of bacteria it is important to know which of the foregoing effects a specific culture of bacteria may have when grown upon a carbohydrate containing medium. This is especially true when it is suspected that the microorganism is pathogenic.

In the past, the fermentative power or ability of a microorganism has been determined by the well known "Durham" or "fermentation" tube technique. Briefly stated, this method comprises placing about 7–10 ml. of a liquid culture medium containing a carbohydrate into a conventional test tube and inverting within the test tube a small "Durham" or "fermentation" tube. Generally this tube is about 6 mm. in diameter and about 50 mm. in length. It is in reality a miniature test tube and is commercially available. With the "Durham" tube in inverted position the conventional test tube and its contents are autoclaved. Upon autoclaving the air is driven out of the inverted "Durham" tube and replaced by the liquid culture medium. In the handling of the autoclaved combination agitation or undue shaking of the autoclaved combination must be avoided to prevent air from entering the inverted "Durham" tube. Generally a single colony or loopful of previously plated bacteria, approximately 1 to 3 mm. in diameter is then used to inoculate the medium without disturbing the inverted tube and the inoculated combination is incubated at 37° C. Frequently evidence of fermentation, such as the formation of a gas bubble in the inverted "Durham" tube and/or the formation of acid, is obtained only after an incubation of 1 to 5 days or more.

It is an object of the present invention to disclose a novel technique for facilitating the identification and classification of bacteria.

It is further an object to disclose a novel apparatus for performing this technique.

These and still further objects will become apparent from the specification in which reference is made to the drawing, in which.

Figure 1:
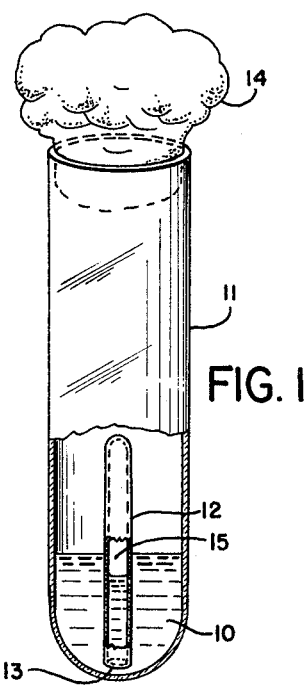
FIGURE 1 is an elevational view, partly in section, of the apparatus of the invention prior to autoclaving.
Figure 2:
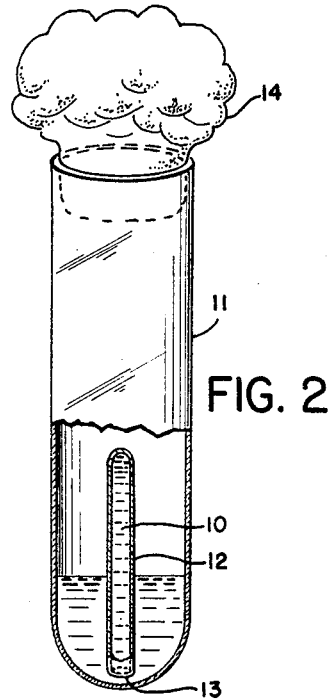
FIGURE 2 is an elevational view of the apparatus, partly in section, of FIGURE 1 after autoclaving.
Figure 3:
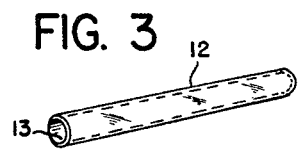
FIGURE 3 is an elevational view of the inverted tube shown in FIGURES 1 and 2.

It has now been discovered that a novel improved micro-fermentation method greatly facilitates the identification and classification of bacteria. This method comprises placing about 0.3 ml. of a culture medium 10 containing carbohydrate in a small culture tube 11 about 6 mm. in diameter and 50 mm. in length. A closed end "capillary tube" 12 is then placed open end 13 downward into the medium in the small culture tube and the mouth of the culture tube is closed with a cotton plug 14 and, the combination is autoclaved whereupon the air 15 is forced out of the "capillary tube" and the medium drawn in (as seen in FIGURE 2). After autoclaving, the medium in the small culture tube is inoculated with a single colony or a loopful of a previously plated bacteria, approximately 1 to 3 mm. in diameter. The inoculated combination is then incubated at 37° C. for a short period of time. Generally in a positive test a gas bubble is seen within as little as 30 minutes and in not more than 2 hours.

The "capillary tube" 12 preferred for use in the present invention is a clear glass tube open at one end 13 and about 10 mm. to about 40 mm. long. Preferably it has an inner diameter of about 0.03 to about 0.06 inch. Such a tube may be readily prepared by flaming one end of a piece of clear glass tubing of the above dimensions until it closes.

The medium 10 for use in the present invention may be any of the commercially available media which either contain a suitable carbohydrate or to which a suitable carbohydrate such as glucose has been added. Generally such media will contain an appropriate pH-sensitive indicator so that the acid formation which often accompanies this type of fermentation will be detected by a color change occurring in the media. With the improved micro-technique of the present invention the production of acid can be detected in minutes.

The amount of medium employed in the present method is substantially less than that employed in previous methods. This reduction in the amount of medium while maintaining the same amount of inoculum is largely responsible for the speed of the test.

The practice of the present invention is further illustrated by reference to the following example.

Example

A 0.3 ml. aliquot of phenol broth (Difco) containing 1% added carbohydrate was delivered to small culture tubes (6 x 50 mm.). A microcapillary tube (0.03 in. x 10 mm.) sealed at one end was inverted in each tube of medium. Tubes were then stoppered with plastic foam and exposed to a temperature of 121° C. at 15 pounds' pressure for 15 minutes. During autoclaving, microcapillary tubes filled completely with media.

Single colonies, approximately 1 to 3 mm. in diameter isolated on initial plating medium, were used to inoculate each tube of test medium. Cultures were incubated at 37° C. in wells of a commercially available constant temperature aluminum block. Use of the block facilitated repeated inspection of tubes for evidence of fermentation.

Results

The micro technique was applied for studying fermentation characteristics of *Escherichia coli, Aerobacter aerogenes, Alcaligenes fecalis, Proteus vulgaris, Salmonella typhosa* and *Salmonella paratyphi*. Phenol red broth containing either 1% glucose, inositol, lactose, maltose, mannitol or sucrose was inoculated with each test organism. Frequently, acid production was detectable in as little as 10 minutes after inoculation. Furthermore, a small gas bubble was often observed in the collection tube after only a 30 minute incubation period. The amount of gas produced by *Escherichia coli* within a 2 hour period measured 2 mm. within the capillary tube. In all instances fermentation characteristics of the organisms could be obtained within a 2 hour period.

Visible signs of fermentation remained clearly discernible for 24 hours. *Alcaligenes fecalis* produced no reaction in any of the test media. These results as well as the others obtained are consistent with those reported by Bergey's Manual of Determinative Bacteriology.

Use of small quantities of test media and relatively large inocula make possible differentiation of enteric organisms in a few hours. For example, lactose fermenting organisms such as *Escherichia coli* and *Aerobacter aerogenes* can be readily distinguished from organisms which do not ferment this carbohydrate. Furthermore, employment of the proposed technique permits rapid identification of organism as well as characterization of specific strains. For example, inositol may or may not be fermented by strains of *Salmonella typhosa*. Such definitive information is valuable in epidemiologic studies.

A series of micro fermentations were performed without flaming the culture tubes prior to or after inoculation. Results obtained using this procedure were the same as those yielded by standard aseptic technique. Likewise, incubation of stoppered and unstoppered culture tubes containing test organisms yielded identical results. These data suggest that use of small culture tubes may limit contamination by air-borne microorganisms.

For immediate laboratory use a conventional cotton plug 14 inserted in the open end of the test tube will suffice to maintain sterility. However, if the tubes are to be subjected to commercial distribution, other types of closures will be required. For example, the test tube can be threaded to receive a conventional screw cap. Alternatively closures comprising an open celled polyurethane plug or a standard lyophilization stopper are acceptable.

The novel method and apparatus of the present invention also provides many other hitherto unavailable advantages. For example, in the past it had been impossible for a commercial diagnostic reagent manufacturer to supply a culture tube, "fermentation" tube and culture medium combination in a form that eliminated the possibility of false positive reactions. This was due to the fact that with the conventional size culture and fermentation tubes any undue agitation during shipping or the like might cause air to displace the medium in the fermentation tube. The novel apparatus of the present invention can be readily subjected to vigorous agitation without any danger of the air replacing the medium in the "capillary tube."

The term "capillary tube" as used in the present application is intended to mean a tube of such sufficiently small inner diameter that the force of capillary action will retain the medium within the tube and prevent the displacement of said medium by air.

It will be readily apparent to those skilled in the art that a wide variety of modifications may be made without departing from the spirit and scope of the present invention.

The embodiments of the invention in which an exclusive property or privilege is claimed are as follows:

1. The method of identifying and determining the fermentative ability of a microorganism without the danger of false positive reactions which comprises:
   (a) placing a liquid medium containing a carbohydrate in a receptacle,
   (b) inverting in the medium in said receptacle a capillary tube which is open at only one end, said capillary tube being so placed that the open end is below the surface of the liquid culture medium,
   (c) autoclaving the thus formed combination to replace all the air in the capillary tube and to fill it completely with medium,
   (d) inoculating the medium with a microorganism,
   (e) incubating said combination sufficiently to promote the fermentation of said medium by said microorganism, and
   (f) checking said combination for gas bubbles and evidence of acid formation.

2. An analytic test apparatus for the identification and classification of microorganisms by virtue of their fermentative properties which comprises:
   (a) culture tube containing a sterile liquid culture medium, which contains a fermentable carbohydrate,
   (b) a capillary tube, which is open at only one end, so positioned that the open end is below the surface of the liquid medium, said capillary tube being completely filled with said medium,
   (c) a stopper closing the mouth of said culture tube thereby preventing the contamination of the contents of said culture tube.

References Cited by the Examiner
UNITED STATES PATENTS

| 1,633,618 | 6/27 | Thomas | 195—103.5 |
| 3,001,403 | 9/61 | Edwards | 195—103.5 |

OTHER REFERENCES

Hansen: Microorganisms and Fermentation, page 44 and plate II, FIG. 4 (1948), QR 151.J6, 1948.

Frobisher: Fundamentals of Microbiology, W. B. Saunders Co., Philadelphia (1953).

A. LOUIS MONACELL, *Primary Examiner.*

ABRAHAM H. WINKELSTEIN, *Examiner.*